(12) United States Patent
Zhu et al.

(10) Patent No.: US 6,401,680 B1
(45) Date of Patent: *Jun. 11, 2002

(54) BOLTED ARTICULATED PISTON

(75) Inventors: Xiluo Zhu, Canton, MI (US); Duraid Mahrus, Wiesbaden (DE); Alan S. Brown, Saline, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,942

(22) Filed: Nov. 8, 2000

Related U.S. Application Data

(62) Division of application No. 09/198,297, filed on Nov. 23, 1998.

(51) Int. Cl.$^7$ .................................................. F02F 3/00
(52) U.S. Cl. ...................................... 123/193.6; 92/220
(58) Field of Search ............................ 123/193.6, 193.4; 92/216, 186, 220, 219

(56) References Cited

U.S. PATENT DOCUMENTS

| 3,877,251 A | * | 4/1975 | Barfiss ........................ 92/216 |
| 4,083,292 A | * | 4/1978 | Goloff ......................... 92/186 |
| 4,237,846 A | * | 12/1980 | Fuchs ....................... 123/193.6 |
| 4,346,646 A | * | 8/1982 | Ellerman ...................... 92/216 |
| 4,581,983 A | * | 4/1986 | Moebus ....................... 92/186 |
| 5,724,933 A | * | 3/1998 | Silvonen et al. ......... 123/193.6 |
| 6,182,630 B1 | * | 2/2001 | Zhu et al. ................ 123/193.6 |

* cited by examiner

Primary Examiner—Marguerite McMahon
(74) Attorney, Agent, or Firm—Reising, Ethington, Barnes, Kisselle, Learman & McCulloch P.C.

(57) ABSTRACT

A piston (20) for an internal combustion engine includes an upper crown (22) and a lower crown (24) that are each fabricated using a same strong material, such as steel and fastened together using a plurality of fasteners (50). The piston (20) provides increased strength resulting in improved design flexibility and smaller sized engines that produce the same amount of power. Piston ring grooves (100, 102, 104) are also provided in either one or both of the upper and lower crowns (22, 24) which control piston combustion height. A deeper combustion bowl (72) is also available with the piston (20).

21 Claims, 2 Drawing Sheets

BOLTED ARTICULATED PISTON

This application is a divisional of application Ser. No. 09/198,297, filed Nov. 23, 1998.

FIELD OF THE INVENTION

The present invention relates to a piston for large bore internal combustion engines and in particular, to an articulated piston having a crown portion formed by connecting an upper crown to a lower crown using fasteners.

BACKGROUND OF THE INVENTION

It is known to use pistons for large bore internal combustion engines. Typically, pistons have essentially two functional parts, a crown and a skirt. There are two basic designs for large bore pistons, articulating and non-articulating. Articulating pistons have separate skirts that can pivot about a wrist pin relative to the crown. In comparison, non-articulating pistons have skirts that are integral with the crown. It is also known to divide the crown into upper and lower portions that are subsequently fastened together to form a three-piece piston. The lower crown includes a pair of pin bosses which each have a pin bore to receive the wrist pin.

Some non-articulating pistons are called composite pistons because they have a steel upper crown connected to an aluminum, or other light alloy, lower crown to reduce weight. Steel is employed in the upper crown to maintain an adequate degree of strength in the head region, which is exposed to very high combustion temperatures and pressures. The steel upper crown is often connected to the aluminum lower crown using precision bolts.

The hybrid metal composition also sacrifices the overall strength of the piston. During operation, pistons experience two separate loads. First, the crown experiences a vertical load from the combustion of the gas gathered in the combustion bowl at the top of the upper crown. It is important to select a material that is strong enough to withstand the combustion load, for example, steel. Next, the skirt receives a side load from the mechanical motion of the crankshaft. In non-articulated pistons, the skirt is integral with the lower crown therefore, both loads are imposed on the entire piston. As a result, the movement and performance of the crown interferes with the movement of the skirt.

Also, hybrid steel/aluminum pistons typically have piston ring grooves located in the side walls of the upper crown because aluminum side walls are not strong enough. If the ring grooves are located in the aluminum side walls, they must be reinforced with a stronger metal alloy to accommodate the vertical load experienced during combustion.

The combined load on the crown and skirt also causes severe fretting wear in known bolted, non-articulated pistons, and reduces service life. Fretting wear occurs in generally stationary joints when very minor amounts of relative movement create microwelding between components, such as between an upper crown and a lower crown. Microwelds are formed and then broken in successive movements between the crown parts. Further, increased fretting wear occurs at the steel/aluminum interface increasing the amount of contamination particles in precision engines and reducing service life of the piston and engine.

The wrist pin is mounted in the pin bores of both pin bosses, constituting a bearing, and must be adequately supported against the piston. Thus the pin boss is the pivot of the piston, the wrist pin and connecting rod assembly. In highly loaded piston applications, a particularly complicated design of the pin boss is needed when aluminum or other light metal alloys are used for the pin boss material. Incipient cracks can occur in the wrist pin if the maximum allowable specific pressure is exceeded. To avoid such cracks in the wrist pin, it is known to profile the pin bore to relieve the stresses caused by deformation of the wrist pin. In a non-articulated piston with an aluminum lower crown, the thickness of the walls around the pin bores and precision profiling of the pin bore itself are necessary to overcome the weakness of the aluminum material.

One alternative for attaching an upper crown to a lower crown is friction welding. However, pistons of 250 mm diameters and more are very heavy and are relatively low volume items. In addition, many friction welding machines do not have enough radial clearance to assemble large diameter pistons. Thus, it is not usually economically feasible to invest in larger friction welding equipment to assemble low volume, large diameter pistons.

SUMMARY OF THE INVENTION

The present invention is directed to an articulated type of piston having a crown portion formed by connecting an upper crown to a lower crown using fasteners. By connecting the upper and lower crown with fasteners, the present invention has greater flexibility for manufacturing, piston design and locations of piston ring grooves.

In the present invention, the upper and lower crowns are made from similar metals, preferably steel. Using steel for both portions of the crown allows for increased flexibility in the location of the piston ring grooves. For example, the piston ring grooves can be located in both the upper and lower crowns because steel does not require reinforcement. By locating at least one compression ring groove in the lower crown, the compression height of the piston can be reduced. The compression height is defined by the distance from the top of the piston to the center line of the pin bore. Reducing the piston compression height results in smaller engine designs that provide the same power as corresponding larger engines. Smaller engines require smaller envelopes in vehicles and are lighter in weight.

It was generally accepted that similar materials have a tendency to attract and weld to each other on a microstructure level. In the present invention, however, fretting wear surprisingly decreased compared to known hybrid non-articulating pistons.

In addition, the articulated piston configuration of the present invention allocates the vertical and side loads between the crown and the skirt, individually. The present invention increases strength and loading providing ability to sustain higher peak combustion pressures. Generally, the weight of the present invention is comparable to the hybrid steel/aluminum type, but with potential to increase engine ratings and lower overall engine weight by providing stronger pistons.

In the hybrid steel/aluminum configuration, the strength of the aluminum lower crown determined the depth of the combustion bowl. The steel upper and lower crown configuration of the present invention, however, increases the ability to form deeper combustion bowls.

In the present invention, using a steel lower crown reduces the need to profile the pin bore because the steel material is strong enough to endure the stress caused by the piston pin.

The steel upper and lower crown configuration of the present invention increases the strength of the crown and the pin bores, the ease of manufacturing, and flexibility of the location of piston rings. Thus, the present invention provides a smaller overall engine with the same power and less overall weight.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
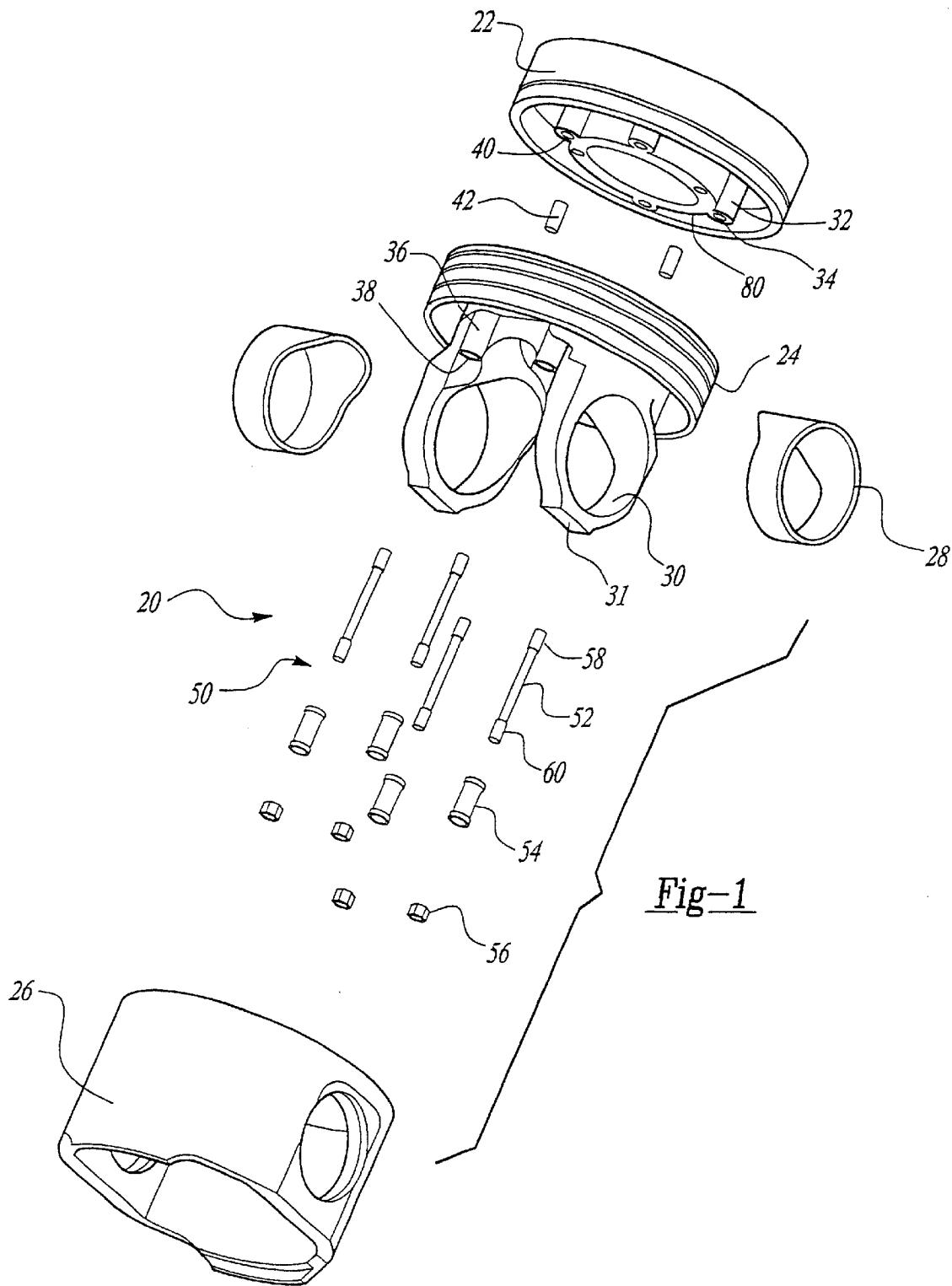
FIG. 1 is an exploded view of a piston assembly according to the present invention.

FIG. 1 shows an exploded view of a piston assembly 20 having an upper crown or crown part 22 that is designed to be attached to a lower crown or crown part 24. A separate skirt 26 is also provided for articulating connection to lower crown 24 by a wrist pin (not shown). A pair of bushings 28 are optionally installed into pin bores 30 in downwardly depending pin bosses 31 to provide a bearing surface for engaging the wrist pin (not shown), which connects piston assembly 20 to a connecting rod (not shown). Upper crown 22 includes a plurality of circumferentially spaced apart bosses 32 having fastener bores 34 that align with corresponding bosses 36 in fastener bores 38 located on lower crown 24. In addition, upper and lower crowns 22, 24 each have a pair of locating bores 40 for corresponding alignment to receive locating pins 42. Locating pins 42 aid during assembly to prevent rotation of upper crown 22 relative to lower crown 24. In addition, locating pins 42 and locating bores 40 serve as orientation indicators to ensure that if a piston assembly 20 is ever taken apart for service. Thus, upper crown 22 will be oriented on lower crown 24 the same as before servicing.

A plurality of fasteners 50 are used to securely attach upper crown 22 to lower crown 24. Fasteners 50 are shown in the form of studs 52, sleeves 54 and nuts 56. However, any suitable type of fastener can be used, including but not limited to, bolts, pins, studs, and screws. Studs 52 include upper and lower threaded ends 58, 60 with a necked down body portion 62 in between. Sleeves 54 are designed to pass over lower threaded ends 60 and seat in lower crown bores 38. Nuts 56 are threaded onto lower threaded ends 60 and are tightened to engage and axially pre-load sleeves 54.

Preferably, both upper and lower crowns 22, 24 are fabricated from the same material to decrease the amount of fretting wear at the interface joint. Preferably, upper and lower crowns 22, 24 are both made from steel to provide increased strength and permit greater flexibility in piston design.

Figure 2:
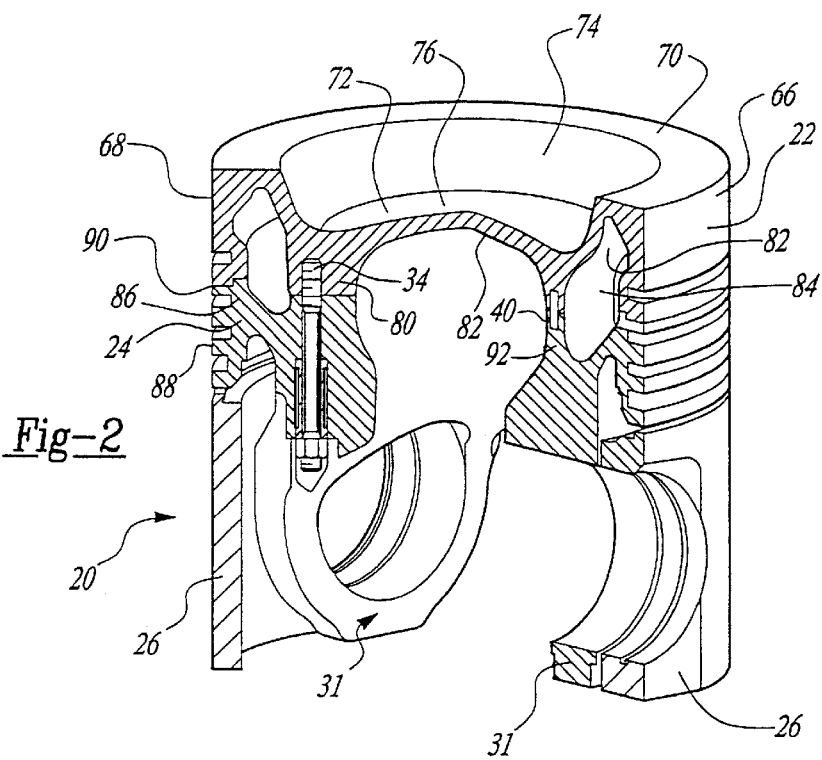
FIG. 2 is a sectioned perspective view of a piston assembly according to the present invention.
Figure 3:
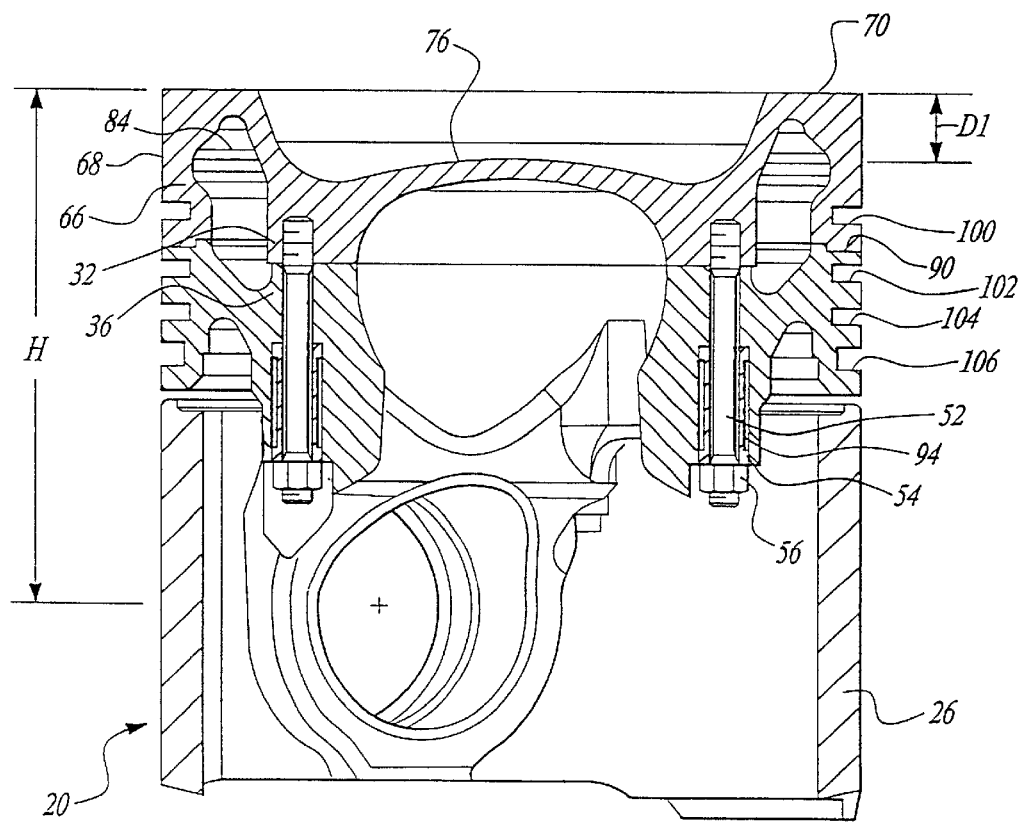
FIG. 3 is a cross-sectional elevational view of the present invention.

FIGS. 2 and 3 show piston assembly 20 including upper crown 22 having an annular outer ring member 66 with a circumferentially extending outer sidewall 68 and an uppermost surface 70. A combustion bowl 72 is located interior of outer ring member 66 and forms a generally depressed recess 74 having a very slightly convex top surface 76. Fabricating lower crown 24 from steel instead of a weaker material, such as aluminum, increases overall piston strength and rigidity and permits combustion bowl 72 to have a deeper design. If a lighter weight material is used for lower crown 24, then the strength of the piston is reduced and would not permit increasing the depth of combustion bowl 72 since the cross-sectional thicknesses would be reduced resulting in increased flexing of pin bosses 31. Thus, combustion bowl top surface 72 can have a substantially increased depth D1 from uppermost surface 70. For example, depth D1 can be up to approximately 15% of the piston diameter, so a piston having an outer diameter of 250 mm can have combustion bowl top surface 76 located approximately 37 mm from uppermost surface 70. However, any suitable combustion bowl shape or configuration can be used with the present invention.

Upper crown 22 also includes an annular ridge or inner wall 80 that depends downwardly from a bottom surface 81 of combustion bowl 72 and is circumferentially continuous. Bosses 32 are formed radially outwardly and adjacent to ridge 80 to provide increased strength where fastener bores 34 are located. In addition, an annular recess 82 is formed between outer sidewall 68 and combustion bowl 72 to define an upper part of a generally continuous cooling gallery 84.

Lower crown 24 has corresponding features that matingly engage with features on upper crown 22. Specifically, lower crown 24 includes an annular recess 83, and an annular outer ring member 86 having an outer sidewall 88. An uppermost surface 90 of ring member 86 is designed to matingly engage ring member 66 of upper crown 22. Also, an annular ridge or inner wall 92 projects upwardly for mating engagement with upper crown annular ridge 80 and includes lower locating bores 40. Additionally, lower bosses 36 and lower fastener bores 38 are located radially outward of locating bores 40 and adjacent to annular ridge 92. A counter bore 94 is optionally provided in fastener bore 38 to receive sleeves 54. Preferably, counter bore 94 has a slightly larger diameter than nut 56 to allow full compression loading of sleeve 54 to develop a fully tensioned fastening system.

Using steel to fabricate both upper and lower crowns 22, 24 provides increased flexibility in the location of piston ring grooves. For example, a first combustion ring groove 100 can be located on outer sidewall 68 of upper crown 22. Second and third combustion ring grooves 102, 104 can be located on sidewall 88 of lower crown 24 because the lower crown 24 is fabricated from high strength steel. An oilscraper ring groove 106 is located below third combustion ring groove 104 and prevents oil from entering a combustion chamber (not shown). Although four total ring grooves are shown, any suitable number of ring grooves are contemplated for the present invention. Moreover, the ring grooves can be located on either upper crown 22 or lower crown 24 or both. As a result, compression height H can be reduced. The compression height is defined by the distance from uppermost surface 70 to the center line of pin bores 30. For example, a 250 mm diameter piston can be produced that has a compression height of approximately 175 mm, or approximately 70% of the piston diameter. Reducing the piston compression height allows for smaller engine designs that provide the same power as corresponding larger engines. Smaller engines also require smaller envelopes in vehicles and are lighter in weight.

Skirt 26 surrounds pin bosses 31 and is preferably made of aluminum to reduce weight. However, any suitable material can be used.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An articulated piston for an internal combustion engine comprising:

an uppermost crown part having an upper surface, a lower surface, and an outer sidewall that defines an outer diameter;

a lower crown part having an upper surface, a lower surface and an outer sidewall and at least one downwardly projecting pin boss for receiving a wrist pin;

said uppermost and lower crown parts being fabricated from ferrous-based metallic material and joined together by a plurality of fasteners and including a separate skirt member fabricated of aluminum-based material coupled in articulated manner to said lower crown part.

2. The piston of claim 1 wherein said uppermost, and lower crown parts are both formed from steel.

3. The piston of claim 1 wherein said at least one fastener comprises a plurality of threaded fasteners spaced circumferentially apart.

4. The piston of claim 1 wherein said lower crown part includes at least one combustion ring groove provided in one of said outer sidewalls.

5. The piston of claim 1 wherein said skirt member pivots relative to said lower crown part.

6. The piston of claim 1 including an upper annular recess in said uppermost crown part located in opposing relation to a lower annular recess in said lower crown part to form a generally continuous cooling chamber.

7. The piston of claim 1 further including a boss having a fastener bore for receiving said at least one fastener.

8. The piston of claim 1 wherein said uppermost crown part includes a lower surface including a downwardly projecting, generally annular ridge having at least one locating feature.

9. The piston of claim 8 wherein said lower crown part includes an upper surface including an upwardly projecting, annular ridge for mating engagement with said upper ridge of said uppermost crown part.

10. The piston of claim 9 wherein at least one of said upper and lower ridges includes a boss located adjacent thereto for forming a fastener bore.

11. The piston of claim 10 wherein said boss is located radially outwardly of said at least one of said upper and lower ridges.

12. A piston for an internal combustion engine comprising:

an uppermost crown part having an upper surface defining a combustion bowl and an outer sidewall having a first combustion ring groove located therein;

a lower crown part having an annular ridge with an outer sidewall and at least one downwardly projecting pin boss for receiving a wrist pin;

a second combustion ring groove located on said outer sidewall of said lower crown part;

an oilscraper ring groove located on said outer sidewall of said lower crown part;

said uppermost and lower crown parts being fabricated from ferrous-based metallic material and joined together by a plurality of fasteners and a separate skirt member fabricated of aluminum-based material coupled in articulated manner to said lower crown part.

13. The piston of claim 12 wherein said uppermost and lower crown parts are both formed from steel.

14. The piston of claim 12 wherein said at least one fastener comprises a plurality of threaded fasteners spaced circumferentially apart.

15. The piston of claim 14 including a plurality of bosses each having a fastener bore for receiving said plurality of threaded fasteners.

16. The piston of claim 12 wherein said skirt member pivots relative to said lower crown part.

17. The piston of claim 16 including an upper annular recess in said uppermost crown part located in opposing relation to a lower annular recess provided in said lower crown part to form a generally continuous cooling chamber.

18. The piston of claim 12 wherein said uppermost crown part has a lower surface including a downwardly projecting, generally annular ridge having at least one locating feature.

19. The piston of claim 18 wherein said lower crown part has an upper surface including an upwardly projecting, annular ridge for mating engagement with said upper ridge of said uppermost crown part, at least one of said upper and lower ridges having a boss located radially outwardly and adjacent thereto for forming a fastener bore.

20. An articulated piston construction comprising:

an uppermost crown part fabricated of a ferrous-based material having circumferentially extending inner and outer walls spaced radially from one another;

a lower crown part fabricated separately from said uppermost crown part of a ferrous-based material, said lower crown part having a pair of pin bosses with an aligned pin bore and circumferentially extending inner and outer walls spaced radially from one another;

a separate skirt joined in articulated manner to said pin bosses of said lower crown part; and a plurality of circumferentially spaced fasteners joining said inner wall of said lower crown part to said inner wall of said uppermost crown part to unite said uppermost and lower crown parts and to provide a circumferentially extending cooling gallery between said inner and outer walls of said uppermost and lower crown parts.

21. The piston of claim 20 wherein said skirt is fabricated of aluminum.

* * * * *

UNITED STATES PATENT AND TRADEMARK OFFICE
CERTIFICATE OF CORRECTION

PATENT NO.     : 6,401,680 B1
DATED          : June 11, 2002
INVENTOR(S)    : Xiluo Zhu, Duraid Mahrus and Alan S. Brown It is certified that error appears in the above-identified patent and that said Letters Patent is hereby corrected as shown below:

<u>Title page,</u>
Item [56], References Cited, insert:
--      2,104,347   Larkin          01/38
        3,385,175   Meier           10/66
        3,915,141   Ottl            10/75
        4,185,544   Kolar           01/80
        4,237,846   Fuchs           12/80
        4,510,895   Slee            04/85
        4,532,686   Berchem         08/85
        4,581,983   Moebus          04/86
        4,603,617   Barth           08/86
        4,831,917   Houben          05/89
        5,081,968   Runi            01/92
        5,724,933   Silvonen et al  03/98
        5,913,960   Fletcher-Jones  06/99

OTHER PUBLICATIONS

"Pistons for Internal Combustion Engines"; ppg 34-36 and ppg. 54-59 VERLAG MODERNE INDUSTRIE, 1995. --

Signed and Sealed this

Eighth Day of October, 2002

*Attest:*

JAMES E. ROGAN
*Attesting Officer*       *Director of the United States Patent and Trademark Office*